United States Patent
Callender et al.

(10) Patent No.: US 6,640,206 B1
(45) Date of Patent: Oct. 28, 2003

(54) PEER NETWORKING IN CONCENTRATED COMPUTER CLUSTERS

(75) Inventors: Robin Lynn Callender, Bellevue, WA (US); Chester A. Heath, Chapel Hill, NC (US)

(73) Assignee: Omnicluster Technologies Inc., Boca Raton, FL (US)

( * ) Notice: Subject to any disclaimer, the term of this patent is extended or adjusted under 35 U.S.C. 154(b) by 0 days.

(21) Appl. No.: 09/465,675

(22) Filed: Dec. 17, 1999

(51) Int. Cl.[7] .............................................. G06F 13/00
(52) U.S. Cl. ........................ 703/253; 709/213; 709/223; 709/238
(58) Field of Search ................................ 709/203, 213, 709/217, 219, 223, 225, 226, 230, 238, 245, 313, 321, 253

(56) References Cited

U.S. PATENT DOCUMENTS

| | | | | |
|---|---|---|---|---|
| 5,920,566 A | * | 7/1999 | Hendel et al. | 370/401 |
| 6,105,122 A | * | 8/2000 | Muller et al. | 712/1 |
| 6,173,374 B1 | * | 1/2001 | Heil et al. | 711/148 |
| 6,233,619 B1 | * | 5/2001 | Narisi et al. | 709/230 |
| 6,311,232 B1 | * | 10/2001 | Cagle et al. | 710/8 |
| 6,453,426 B1 | * | 9/2002 | Gamache et al. | 714/4 |

* cited by examiner

Primary Examiner—Viet D. Vu

(74) Attorney, Agent, or Firm—Kaplan & Gilman, LLP

(57) ABSTRACT

A presently disclosed network oriented multiprocessing system, concentrated into a small space, uses a LAN (local area network) emulation protocol to transmit data packets directly between processing subsystems of the system via a bus connecting the processing subsystems. The processing subsystems and bus thereby constitute components of a virtual LAN defined by the LAN emulation protocol. The system also contains a storage subsystem which is connected to the same bus and is not a part of the virtual LAN. The spatial concentration of the system allows the bus to be operated at a speed sufficient to enable the processing subsystems to share access to the storage subsystem via the bus for retrieving stored information immediately relevant to program processes being executed in respective processing subsystems. Signal processes on said bus representing transfers relative to said virtual LAN are distinctly different from signal processes on the bus that are used to transfer information between said storage and processing subsystems. The virtual LAN defined by the LAN emulation protocol contains a virtual port for each processing subsystem currently active in the virtual LAN. This virtual port construct serves to maintain compatibility between software applications which define the LAN protocol and operating system software which supports both the LAN applications and other applications. The LAN emulation protocol permits each processing subsystem to independently initiate a failure communication to the other processing subsystems as well as to independently remove itself from and re-insert itself into the virtual LAN. It also permits any processing subsystem to conduct a "broadcast" data packet transfer to all other processing subsystems.

4 Claims, 2 Drawing Sheets

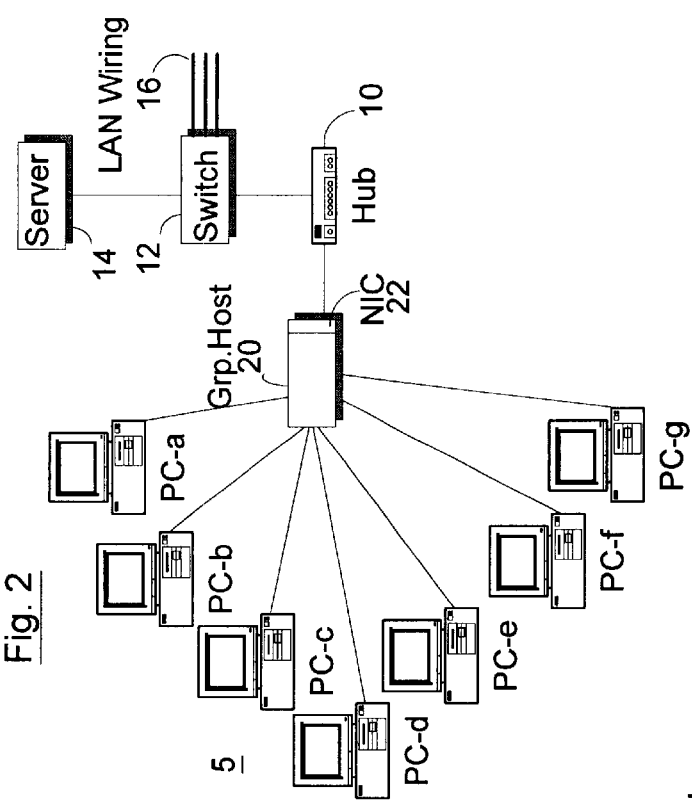
Fig. 2
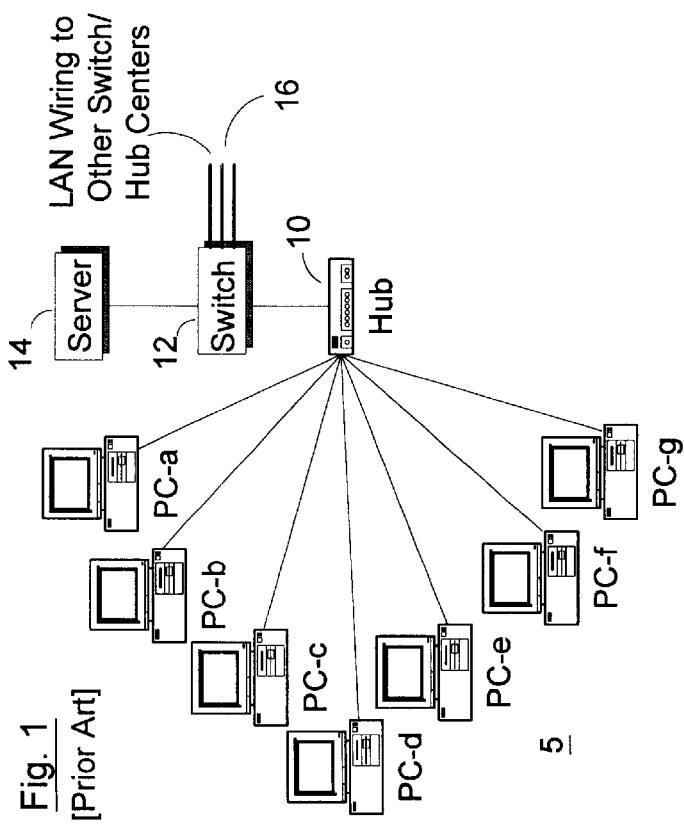
Fig. 1 [Prior Art]
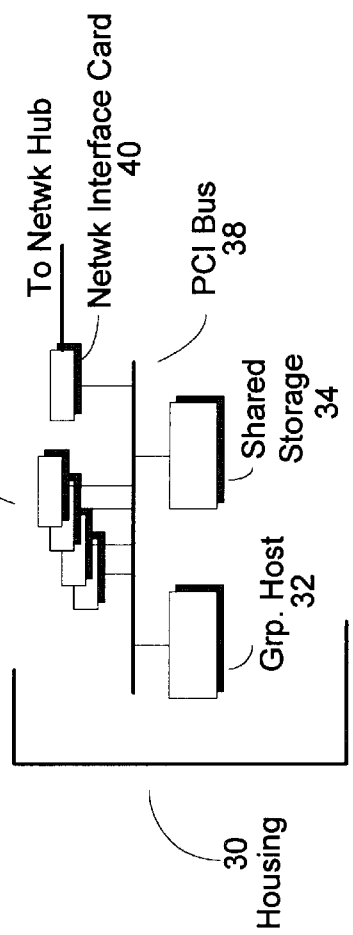
Fig. 3

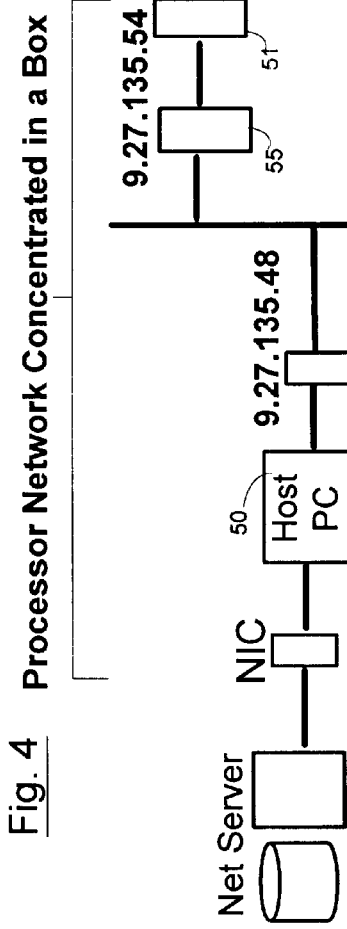

Fig. 4  Processor Network Concentrated in a Box

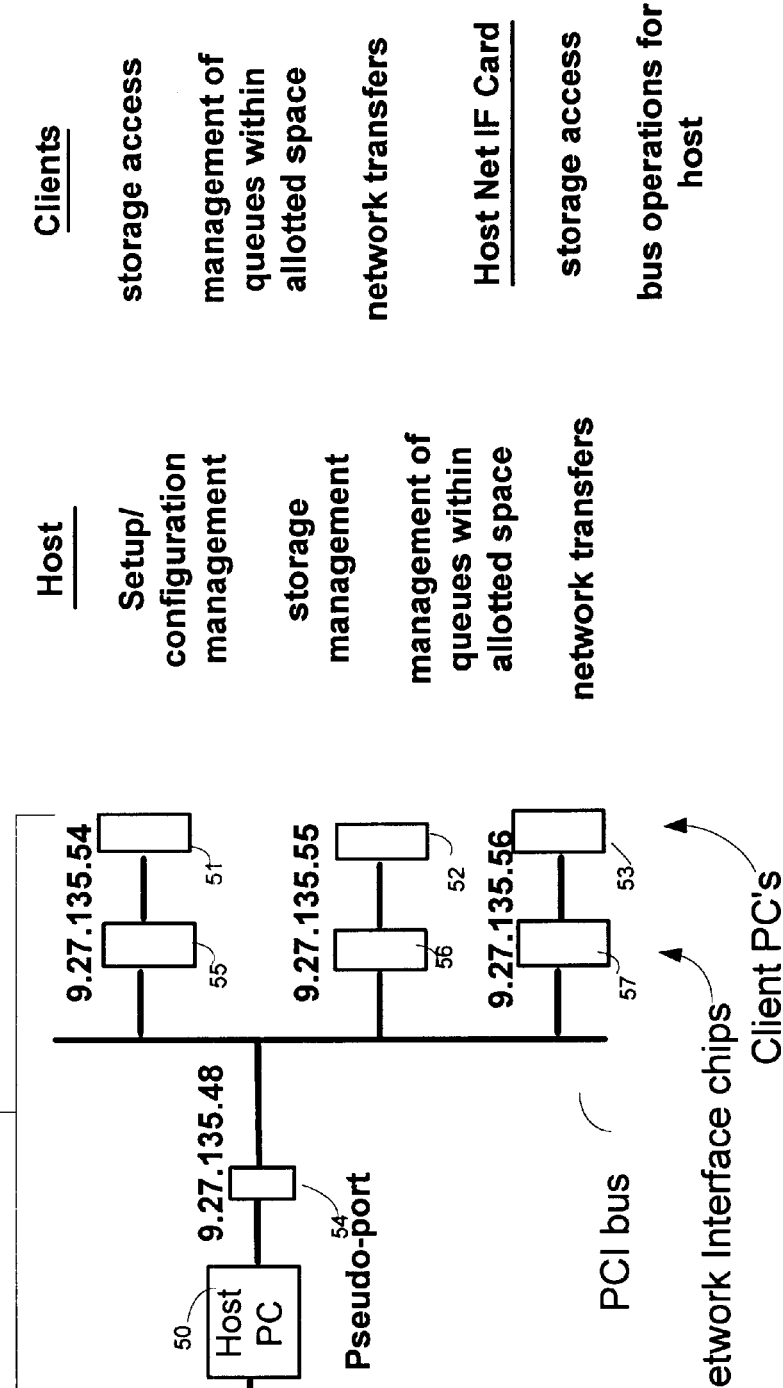

Fig. 5

Host
- Setup/configuration management
- storage management
- management of queues within allotted space
- network transfers Clients
- storage access
- management of queues within allotted space
- network transfers Host Net IF Card
- storage access
- bus operations for host Legend:
Host and client PC's exchange data packets via PCI bus. Host also can act as agent for clients in packet handling (e.g. to apply compression and security functions to packets sent to external network).

PEER NETWORKING IN CONCENTRATED COMPUTER CLUSTERS

CROSS-REFERENCES TO RELATED APPLICATIONS

Application Ser. No. 04/466,463 by C. A. Heath et al, entitled MODULAR ARCHITECTURE FOR SMALL COMPUTER NETWORKS and filed Dec. 17, 1999, now U.S. Pat. No. 6,564,274, concerns a modular computer architecture in which the present invention can be advantageously used. The disclosure of that application is incorporated herein by this reference.

DEFINITIONS

Cluster: A small local area network (LAN) with fewer than 32 nodes

Modular System: A spatially concentrated cluster conforming to the present invention (e.g. a cluster concentrated within a single box/housing), wherein the data transmission medium of the respective LAN is a bus having characteristic,short length and ultra high speed of operation, and wherein computers at the network nodes of the cluster have modular form; facilitating their use as either workstations or network servers or both workstations and servers.

BACKGROUND OF THE INVENTION

Presently, when plural computers are used within the confines of a single residence or commercial plant or office, it is common practice to link such computers into a LAN by externally attaching the computers to media used in such networks. Typically, this is done to enable the computers and their user(s) to share access to stored data and to data communication networks external to the respective LAN (e.g. the Internet, the telephone system, etc.). In this environment, connection of the LAN to external networks is usually provided through a hub, switch and server that control routing of data both between the LAN and the external network as well as between individual computers in the LAN.

A disadvantage of this is that handling of local transfers through the hub effectively increases traffic loads at the hub, switch and server, so that the volume of peak traffic that can be moved through these elements is less than it could be if local transfers were not being handled through the hub.

The present invention seeks to provide a more efficient arrangement for handling local data transfers within such networks.

SUMMARY OF THE INVENTION

In accordance with the present invention, a modular system is provided as defined above, containing a concentrated LAN composed of computers connected by an ultra high speed bus which serves as both a network transmission medium, between computers at nodes of the respective LAN, and a conventional parallel-transfer bus medium for connecting individual computers in the system to shared storage resources which are accessible to those computers only through the bus.

Used as a network transmission medium, the bus enables any computer in the system to transfer data packets to any or all other computers in the respective modular system. Such packets are encapsulated in a header, unique to the respective LAN, designating the origin and destination(s) of the data, and can be of arbitrary length. Thus the amount of data in a transmitted packet can be significantly greater than the amount of data which can be transferred over the bus in a single cycle of conventional parallel-transfer operation.

As presently contemplated, a concentrated LAN in accordance with our invention is actually a virtual construct used by the computers in the respective modular system; i.e. it is a construct used by emulation software applications executed by these computers. Within this construct each computer in the system has a uniquely defined network address or pseudo-port (also termed "virtual" port) which has no significance external to the respective system. Thus, use of these pseudo-ports effectively isolates computers at nodes of the respective concentrated LAN from external networks, and also serves to maintain compatibility between operations of LAN emulation applications and operating system software such as Windows NT used at these nodes. More specifically, in respect to software compatibility, the pseudo-port construct allows for modular transmissions on the bus of the respective modular system to contain control signals which need not correspond to control signals used for conventional paralleltransfer operations on the same bus. These and other advantages of the isolation and compatibility features associated with use of the presently contemplated pseudo-port construct will be readily appreciated by those knowledgeable in the arts associated with contemporary data networks and computer systems.

The modular forms of the computers in the subject concentrated LAN allows for a computer at any node to be configured for operation as either a workstation or a network server between a network external to the respective concentrated LAN and other nodes of that LAN, or even as both a workstation and external network server. Furthermore, the transmission protocol used in the subject LAN is compatible with protocols used in external networks so that routing of data packets between an external network and a node of the concentrated LAN requires only a simple modification of header intelligence accompanying the packet.

In a preferred embodiment of the invention, the modular system contains a host computer, plural client computers, the high-speed bus and storage resources that are managed by the host computer subsystem through a connection thereto separate from the high-speed bus and access to which is shared by the client computers via the highspeed bus. A feature of this arrangement is that it allows for the host computer subsystem to efficiently manage the shared storage resources and initial diagnostics of the systems, while the LAN emulation protocol presently contemplated allows any client computer to efficiently transfer network data packets directly to any or all other computers (both client and host) in the respective modular system without requiring intermediate routing of such packets through the host subsystem or any other component of the system that could be likened to a hub of a more conventional LAN.

Another feature of this invention is that when a modular system transfers data packets from a network external to the system to an internal node on the system's bus, the system computer interfacing between the external network and the modular system bus employs plural levels of network emulation. At a first such level, the interfacing computer encapsulates a data packet in a first level header, that header indicating origin and destination addresses unique to the respective concentrated LAN and having no extrinsic meaning or context in the external network, and in a second level emulation, the interfacing computer encapsulates the transferred packet in an additional second level header indicating origin of the packet in the external network. In a transfer in the reverse direction, from concentrated LAN to external network, a similar two-level emulation is used to indicate internal origin and destination addresses in the concentrated LAN and a destination address in the external network. It is understood of course, that a packet originating and terminating within the module system is encapsulated only in the first level header.

In an outgoing transfer to the external network, the first level header effectively designates the port on the system bus which connects to the computer system that interfaces to the external network as an interim "internal" transfer point for the packet, and the second level header indicates the origin and final destination of the packet in global terms that are unique to and meaningful in the external network.

Thus, client computers in the modular system can exchange data as peers, using only the first level LAN emulation, and such exchanges have no impact on the volume of data traffic between the concentrated LAN and external networks. Furthermore, computers in the concentrated LAN cluster can route data to and receive data from an external network, using the first and second levels of LAN emulation, without burdening any computer that is not directly involved in such transfers. These functions distinguish the present system from conventional LAN clusters wherein data flowing between internal nodes of the cluster are required to be routed through hubs carrying data between the local cluster and external networks, and thereby add to the traffic burdens of such hubs.

Using the first and second levels of LAN emulation, packets passing between the internal bus of a concentrated LAN and an external network undergoes format conversions at the pseudo-port interfacing to that network. Thus, packets on the bus are invariably in a form in which destinations inside the local cluster are unambiguously distinguishable locally from external destinations, and packets being routed to or from a terminus outside the cluster are always in a form in which origins and/or destinations outside the cluster are globally recognizable in the external network.

This type of arrangement is particularly effective in computer clusters conforming to the modular architectures described in the above-referenced co-pending patent application by Heath et al entitled MODULAR ARCHITECTURE FOR SMALL COMPUTER NETWORKS. In such systems, computer modules forming the locally concentrated LAN or cluster consist of a host computer, storage resources, and bus residing on a system board, and client computers that plug interchangeably into sockets on the system board which connect to the bus. This type of system is tightly concentrated into a small space or box comparable in size to the space occupied by the housing of a contemporary personal computer system. The system bus that necessarily has a small length due to this concentration of the elements that it connects, can be operated at data transfer rates much greater than transmission media used in traditional local area networks (LAN's), having longer lengths (e.g. lengths measured in feet or kilometers, as compared to the inches of the present system bus) so that transfers of the additional digits required to provide the foregoing first and second levels of encapsulation have negligible impact on the traffic handling capacity of the bus.

According to another aspect of the invention, computers constituting components of a presently contemplated modular system as defined above employ a network emulation protocol configuring the computers in the system into a virtual LAN, which protocol enables each computer in the system to direct transfer of a packet of data to any other computer in the system, via the system's bus, and also enables each computer in the system to direct a packet transfer concurrently to a plurality of other computers in the system via that bus.

A feature of the just-mentioned network emulation protocol is that it also enables each computer in the modular system to initiate a failure indication to the other computers via said virtual LAN, without being requested to do so, and it also allows each computer to remove itself from and re-insert itself into the virtual LAN without having to be commanded to do so by another computer in the system.

The foregoing and other features, benefits and advantages of the present invention will be more fully understood by considering the following description and claims.

BRIEF DESCRIPTION OF THE DRAWINGS

FIG. 1 is a schematic illustrating traditional network topology, for use in explaining a problem addressed presently.

FIG. 2 is a schematic of a modified network topology solving some problems associated with the topology of FIG. 1.

FIG. 3 is a schematic of a concentrated multiprocessor network in accordance with the present invention.

FIG. 4 is a schematic for explaining addressing protocols used in the network of FIG. 3.

FIG. 5 is a chart illustrating functional responsibilities of the various processors shown in FIGS. 3 and 4.

DETAILED DESCRIPTION

1. Problem Addressed by Our Invention

FIG. 1, which illustrates presently traditional local area network (LAN) clustering principles applied to personal computers (PC) and workstations, is used to explain a problem solved by the present invention. Workstations, in this context, includes devices associated with PC's (e.g. printers, etc.). A group of workstations 5 (designated PC-a, PC-b, . . . , PC-g) connects via a common local hub 10 and switch 12 to a server 14. Switch 12 also connects to wiring 16 extending to a LAN (local area network) adapter device through which data can be routed (in packet form) to other adapters, switches and hubs associated with other clusters of workstations and associated devices.

Inbound data packets are received from remote PC's or other devices linked to LAN wiring 16, and routed to server 14 via switch 12. The data is queued at the server, and subsequently forwarded to a destination in group 5 via switch 12 and hub 10; the destination specified typically in a header accompanying each packet. Thus, the switch is required to handle two communications for each data packet transferred in this manner; one for conveying the packet to server 14 and another for conveying an image of the packet from the server to its destination.

For outbound packet transfers, a similar process occurs. Data originated at a station in group 5 is routed through the hub and switch to server 14, queued at the server, and subsequently forwarded externally, again via the switch 12. Consequently, in this process there are also two transmission loads at the switch for each data packet transferred; one for conveying the packet to server 14 and another for conveying an image of the packet from the server to its (external) destination.

A similar process occurs for "internal" communications between stations 5. For example, for PC-a to send data to PC-g, PC-a prepares a data packet addressed to PC-g and sends it to server 14 via hub 10 and switch 12. The packet is queued at the server (along with other data contained in current packet traffic), and later forwarded to PC-g via switch 12 and hub 10. Here, there is not only a double transmission load at switch 12 for each packet transfer, but also a double transmission load at hub 10 for each transfer.

Those skilled in the art will recognize that the increased traffic imposed by these double transmission loads can be detrimental to network throughput, and severely curtail the amount of productive throughput that can be handled at peak capacity. A part of the problem to which the present invention is addressed is how to decrease such redundant loading of network elements.

2. Part of the Solution Presently Contemplated

A part of the presently contemplated solution is indicated in FIG. 2. Another part of our preferred solution is explained with reference to FIGS. 3 and 4.

As shown in FIG. 2, a group host processor 20, and a network interface card (NIC) 22 residing at that processor, are introduced between the local group of PC's 5 and their network hub 10. In this arrangement, transfers of data between server 14 and LAN wiring 16 are processed as in FIG. 1, but transfers of data between server 14 and the PC's 5 require additional handling at group host processor 20. On the other hand, with this arrangement, transfers within the group 5 are handled exclusively through group host 20; i.e. without presenting unnecessary traffic loads at switch 12 and/or server 14. Therefore traffic at the external network interface is not limited by the internal traffic.

Although host processor 20, as seen here, appears to be a network component additional to the elements shown in FIG. 1, it will be seen later that host 20 can be made to assume the functions of server 14 and thereby eliminate the latter as a component.

3. Another Part/Aspect of the Presently Contemplated Solution

The additional part or aspect of the present solution alluded to previously is explained with reference to FIGS. 3 and 4. Here, a portion of the network shown in FIG. 2—specifically, the sub-network represented by PC's 5, group host 20 and NIC 22—is replaced by a concentrated/modular system assembled within a single housing 30. Details of such systems and their applications are described in the co-pending patent application by Heath et.al referenced above and incorporated herein by reference.

In this system, host processor 32, shared storage 34, and user interface cards 36 reside on a common not-shown motherboard structure within enclosure 30. Host 32 and accessories managed by it (memory, disk storage, etc.) are mounted directly on a planar substrate of the motherboard, and cards 36 are removably plugged into sockets extending out of the motherboard; i.e. in a configuration similar to the organization used in present PC systems to support peripheral devices and device adapters.

Cards 36 are PC compatible processors constructed with ample processing power but minimal on-card storage. Instead, these cards rely on shared storage 34 for their programs and data. Storage 34 is managed by the host processor and shared by that processor with the cards via system bus 38. As described in the referenced copending application by Heath et al, cards 36 may interface to and interact directly with users at sites remote from this system, via not-shown remote accessories at such sites; e.g. via input devices (keyboards, mice, etc) and display monitors. Thus, each user interface card has functionality potentially equivalent to a complete "stand-alone"personal computer but requiring a fraction of the power and storage apparatus traditionally sold with and associated with contemporary PC systems.

All of the foregoing elements are connected to each other via a common PC compatible bus 38 called the "system bus". Bus 38 is preferably constructed and utilized as an architecturally standardized system element; e.g. it can be configured as a standardized PCI bus conforming to published architectural standards; available e.g. through Internet site www.PCISIG.com . The limited length of this bus (as constrained by the present cluster environment) permit it to be operated at extremely high bit transfer rates, and thereby allow for the sharing of resources by computer systems on the present system board and diskless cards. Thus, data can be passed over this bus at rates much higher than rates associated with data transfers over ordinary local area network (LAN) media.

Network Interface Card 40, also mounted in a socket on the not-shown motherboard and also connected to bus 38, provides a link between that bus and a notshown interface to networks external to housing 30 (e.g. to public telephone networks, the Internet, etc.).

In this system, host processor 32 has a not-shown connection to storage resources 34$a$, 34$b$ separate from bus 38. However, client processors 36 use bus 38 to access storage resources 34$a$, 34$b$ in real time coordination with execution of program applications currently being processed by them. For such storage access functions, the client processors operate as bus masters using a bus protocol conventional to PCI buses. In addition, the host and client processors are configured to communicate as a virtual LAN via bus 38 using a bus control protocol different from the one used in storage access. In network communications, packets of data potentially larger than the amount of information transferred in a storage access cycle are transferred from one of the processors 32, 36 to one or more other processors in the same group. As in conventional LAN processes, each packet is encapsulated in a header specifying among other things the origin and destination(s) of the respective transfer.

In such "internal LAN" transfers, all processors connected to bus 38 act as peers; i.e. the host or any client processor can originate a transfer and the host or any client processor can be a direct destination of a transfer. A unique aspect of this, relative to the illustrated configuration, is that the host processor is not required to perform intermediate handling in transfers between client processors.

Furthermore, such internal LAN transfers are performed by emulation applications on the origin and destination processors, and they are directed between "pseudo-ports" on bus 38 representing origin and destination nodes. The pseudo-ports are logical constructs associated with the LAN emulation processes, and serve to maintain compatibility of bus usage between associated LAN processes and other applications and operating systems running on the present host and client processors.

FIG. 4 illustrates this internal LAN configuration schematically. The host system is indicated at 50 and the client systems at 51, 52 and 53. The host's pseudo-port is at 54 and client network interface chips, seen at 55, 56 and 57 (refer to cross-referenced patent application by Heath et al) implement pseudo ports for their respective processors. The pseudo-ports have global network addresses (addresses meaningful outside the system) figure and internal network addresses. All global addresses in one system have a common prefix set of numbers (in the illustration, the set "9.27.135") and a 2-digit suffix associated uniquely with the respective (pseudo) port. Thus, "48" uniquely designates the host's port, and suffixes "54", "55" and "56" uniquely designate ports of respective clients 51, 52, and 53. The internal port addresses are a simple set of two digit numbers like: 01, 02, 03 and 04.

Although the specific network protocol used is considered immaterial to the invention presently considered, it is noted however that token ring and Ethernet protocols are considered suitable for use in this environment; token ring considered to have an advantage over Ethernet in respect to supporting flexible frame sizes. Such protocols involve transfer of a packet accompanied by a header, the latter designating origin and destination, and receive-side filtering wherein signals are examined at all ports other than the transmitting one, a determination is made at each port as to whether it is a specified destination, and a signal is returned by each intended recipient indicating status of acceptance of the packet.

A transfer may be point to point (from an origin port to a single destination port), "multicast" (from origin to plural ports) or "broadcast" (from origin to all other ports). Since most conventional LAN protocols do not necessarily support multicasting or broadcasting type transfers, emulation software implementing these functions should be so constructed that a lowest layer receives only information for point to point transfers and passes that information along to a higher emulation layer which interprets them as requiring a single, multicast or broadcast destination.

A transfer process operates as follows. At the origin station, layered emulation software determines the transfer destination(s), forms a packet header suited to that transfer, and directs transmission of bus signals representing the chosen header and the desired data packet (or a portion of the latter). At all other ports, layered software inspects the header, determines if the respective port is an intended destination, stores the packet intelligence in a buffer if the port is a destination, and returns a signal identifying the port and its status of packet reception.

In the header, origin and destination ports may be indicated both in global and internal forms. In the indicated configuration, wherein the host system interfaces to external networks, when a determination is made that the host port is an internal destination, the host must make an additional determination of whether the data is intended for the host system per se or for routing to a destination in the external network. When the data is for external routing, the host changes the header to indicate the origin and external destination in global terms and forwards the received packet data to the external network interface. Similarly, when the host system receives a data packet from the external interface the system emulation software determines final destinations of the received data. If one or more client ports are indicated, the host modifies the header to the appropriate internal network format and forwards it to the designated client ports.

It should be understood that with sufficient processing power the host system can perform all server functions associated with such internal and external network transfers. It should also be understood that the client systems can be linked directly to external network interfaces and operate as servers between such interfaces and the rest of the system.

FIG. 5 lists functional responsibilities of the various processors shown in FIGS. 3 and 4. As shown here, the host processor is responsible for system setup/configuration, including management of the bootstrap process by which the system is initialized. The host is also responsible for managing the shared on-board storage, including allocation of its capacity to the cards, supervision of signal processes on the PCI bus (including timing of those processes), management of queues within portions of shared storage allocated to the cards, and network packet communications flowing directly between the host and either the User cards or the external LAN interface card.

The network interface card is responsible for managing signaling processes on the PCI bus requisite to that card's use of shared storage as well as to that card's non-network signal communications relative to the host, and also for managing the routing of network data packet communications between the external LAN and the respective group.

Each user interface card is responsible for managing signaling processes on the PCI bus requisite to that card's use of shared storage as well as to that card's non-network signal communications relative to the host, and also for managing its network packet communications relative to both the external LAN and the other processors in the respective group.

4. Extensions and Applications of the Invention

The following observations are directed to applications and extensions of the invention. Although what is said here may possibly be evident to one skilled in the art given the preceding description, it is said here for completeness.

Although embodiments of the modular system form of the invention, as described, may presently have sockets, internal space and power for only 3 or 4 client computer cards, it should be recognized that with present trends in technology it will be increasingly possible to accommodate many more client computer subsystems in such modular systems. The present trends of chip and circuit technology indicate that systems based on such will have progressively increased density of packaging of chips and their circuits, increased speeds of operation of such chips and circuits, and increased speeds of operation of computer system buses. An evident result envisioned by the present applicants is that there may be virtually unlimited future potential for enlarging concentrated networks, of the type presently considered, to include many more nodes than the number presently exemplified; even allowing for one node per client card and host. Furthermore, it is understood that as client card circuits become more concentrated, a single card may eventually contain multiple client computer subsystems, which would lead to configuring respective networks to contain multiple nodes per card and multiple host nodes; thereby increasing the future size and usefulness of concentrated networks conforming to this invention.

Furthermore, since each client computer subsystem can be configured as a workstation or server or both, it is envisioned that a system of the present type would be able to efficiently link to multiple data networks (public and/or private) external to the system.

The foregoing and other aspects of this invention are defined in the following claims.

We claim:

1. A local area network (LAN) system comprising:
multiple data processing subsystems concentrated into a small volume of space comparable to the space occupied by a presently conventional personal computer;
a storage subsystem managed by one of said processing subsystems; and
a bus connected directly to said storage subsystem and each of said processing subsystems; wherein:

said bus is controlled directly by individual of said processing subsystems to enable said processing subsystems to individually obtain direct access through said bus to said storage subsystem;

said bus is operated at a speed sufficient to enable each said processing subsystem to coordinate its real-time program execution processes with accesses to said storage subsystem via said bus, whereby information obtained by such accesses is immediately useful to sustain a said real-time process; and wherein said processing subsystems are connected to a coaxial cable containing 3 signal bearing lines;

a first one of said lines being used to carry information in an unmodulated form constituting intelligence for forming a video display, a second one of said lines being used to carry data in modulated form between said card and said remote equipment, and a third one of said lines being used to carry signals for synchronizing reception of data sent from said card to said remote equipment and transmission of data sent from said remote equipment to said card.

2. A LAN system in accordance with claim 1 wherein:

said processing subsystems include a host processing subsystem and plural client processing subsystems, said host subsystem managing said storage subsystem and having access to said storage subsystem through a connection thereto separate from said bus;

said client subsystems having access to said storage subsystem only through said bus; and at least one of said host and client subsystems interfacing directly between said concentrated LAN system and a data communication network external to said system.

3. A LAN system in accordance with claim 2 wherein:

said system is contained within a common housing and supported on a common substrate;

said host processing subsystem, said storage subsystem and said bus are attached directly to said common substrate;

said common substrate also contains sockets directly attached thereto for receiving pluggable cards which can be removed from said system; and said client processing subsystems are contained on said pluggable cards.

4. A LAN system in accordance with claim 1 further comprising software dependent upon an operating system used in each of said processing subsystems for implementing a common network protocol by said operating system serving to allow respective processing subsystems to use said bus for data transfers unrelated to LAN transmission processes in said LAN system; and a plurality of virtual ports that are so configured by said dependent software as to maintain compatibility between bus processes defined by said dependent software and other bus processes permitted by said operating system.

* * * * *